United States Patent [19]

Solari

[11] Patent Number: 5,333,276
[45] Date of Patent: Jul. 26, 1994

[54] METHOD AND APPARATUS FOR PRIORITY SELECTION OF COMMANDS

[75] Inventor: Edward Solari, Monmouth, Oreg.

[73] Assignee: Intel Corporation, Santa Clara, Calif.

[21] Appl. No.: 816,384

[22] Filed: Dec. 27, 1991

[51] Int. Cl.⁵ .............................................. G06F 13/38
[52] U.S. Cl. .................................... 395/325; 395/250;
364/262.4; 364/262.9; 364/239; 364/239.4;
364/240; 364/240.2; 364/DIG. 1
[58] Field of Search ............... 395/250, 325, 200, 425,
395/725, 275, 800; 371/40.1; 370/85.1, 32;
340/825.5; 365/189.05

[56] References Cited

U.S. PATENT DOCUMENTS

| | | | |
|---|---|---|---|
| Re. 33,426 | 11/1990 | Sugimoto et al. | 370/85.14 |
| 4,360,869 | 11/1982 | Stanley et al. | 364/200 |
| 4,722,051 | 1/1988 | Chattopadhya | 364/200 |
| 4,744,023 | 5/1988 | Welsch | 364/200 |
| 4,956,771 | 9/1990 | Neustaedter | 364/200 |
| 4,965,801 | 10/1990 | DuLac | 371/40.1 |
| 5,029,074 | 7/1991 | Maskas et al. | 364/200 |
| 5,099,416 | 3/1992 | Tanaka et al. | 395/425 |
| 5,121,480 | 6/1992 | Bonke et al. | 395/250 |
| 5,121,485 | 6/1992 | Ujiie | 395/325 |
| 5,125,071 | 6/1992 | Ozeki | 395/100 |
| 5,131,081 | 7/1992 | MacKenna et al. | 395/275 |
| 5,175,826 | 12/1992 | Begun et al. | 395/325 |
| 5,179,679 | 1/1993 | Shoemaker | 395/425 |
| 5,203,007 | 4/1993 | Gallagher | 395/800 |
| 5,226,150 | 7/1993 | Callander et al. | 395/575 |

OTHER PUBLICATIONS

IBM TDB vol. 30, No. 7, pp. 110–111 (Dec. 1987) "Flexible Priority Mechanism for Resolution of Multiple Requests to System Storage".

*Primary Examiner*—Gopal C. Ray
*Attorney, Agent, or Firm*—Blakely, Sokoloff, Taylor & Zafman

[57] ABSTRACT

A method and apparatus for minimizing processor idle time resulting from the transfer of data between the processor and a resource. An intelligent First In First Out (FIFO) queuing scheme provides a basis for the transfer of data between a host bus and a system bus or between a bus and a resource. The FIFO posts write requests and provides an acknowledgement back to an originating resource on the host bus that the write request has been received. This acknowledgement enables the processor to continue processing. The FIFO further provides for detection of conditions where posted information may be processed out of First In First Out order and conditions where FIFO registers may be read from or data fields overwritten. This capability additionally minimizes idle time by reducing the number of posted items that need to be written to a resource during a read cycle to that resource.

28 Claims, 11 Drawing Sheets

| FLAG -302- | TYPE -303- | ADDRESS BLOCK IDENTIFIER -304- | ADDRESS -305- |

FIGURE 3a

| FULL/EMPTY -310- | PRIORITY READ -311- | WRITEBACK -312- | DOUBLE-WRITE -313- | PRIORITY WRITE -314- | RESERVED -315- |

FIGURE 3b

| MEMORY VS. I/O SPACE -320- | SYSTEM BUS VS. LOCAL BUS -321- | RESERVED -322- |

FIGURE 3c

METHOD AND APPARATUS FOR PRIORITY SELECTION OF COMMANDS

BACKGROUND OF THE INVENTION

1. Field of the Invention

The present invention relates to the field of inter-component communication in a computer system, in particular, the present invention is directed towards minimizing processor idle time during read and write cycles.

2. Description of the Related Art

Known computer systems are designed with multiple bus structures. A bus structure is a communication medium through which different components in a computer system transfer data signals. It is typical that a computer system will have a host bus and a system bus. Resources such as a Central Processing Unit (CPU), system Random Access Memory (RAM) or Read Only Memory (ROM) reside on a host bus. The host bus has a high operating speed which provides for high speed communication. A system bus is typically a slower speed bus to which peripheral resources are connected, e.g. keyboards, disk drives, displays etc.

It is necessary for operation of the computer system that the processor on the host bus write to or read from resources on the system bus. A buffer is positioned between the host bus and system bus to provide for inter-bus communications. One function of a buffer is to compensate for the differences in speed between the two bus structures. A second function of a buffer is the storing of resource access requests, i.e., read or write requests. Such a buffer that is used for storing writes is embodied in the 82353 EISA Bus Buffer, available from the Intel ® Corporation of Santa Clara, Calif. Such a buffer is generally used in conjunction with other logic devices to perform the management of the requests.

With respect to this queuing of resource requests, it is common for a processor in a computer system to remain idle after a data "write" operation to a system resource, e.g. a hard disk, until the data is received by the resource. The sequence of writing data to a system resource is termed a "write cycle". A write cycle typically comprises the step of a processor issuing a write operation followed by an acknowledgement from the resource that the data has been received. The processor must remain idle until this acknowledgement is returned. The idle time increases in proportion to the activity on the system bus. This forced idle time results in a significant portion of potential processing time being unusable.

A known technique for minimizing the duration of a write cycle is to add intelligence, i.e. processing logic, to the buffer between a host bus and system bus. Typically, a First In First Out (FIFO) queuing means is incorporated into the intelligent buffer. An intelligent buffer, hereinafter referred to as a FIFO, will store a write command, send an acknowledgement back to the processor and initiate write cycles from the FIFO. The process of the FIFO accepting the data is termed "posting data". The acknowledgement is sent back to the processor so that it may continue processing. Write cycles are initiated on a First In First Out basis, when it is determined that the system bus is available to the FIFO.

As the FIFO is the bridge between the host bus and the system bus, the FIFO must also provide for "read" requests from the processor to system resources. Most system resources require that all outstanding "writes" to the resource be performed prior to any "reads". This requirement insures the integrity of the data being read. The process of performing all the writes is termed "flushing" the FIFO. In known FIFO systems, all the posted data in the FIFO is "flushed", rather than limiting the flush to the posted data that is associated with the resource from which data is to be "read". As the processor must remain idle until the requested data is provided (i.e. read), the potential for extensive idle time exists. It is desirable to flush only the posted data that is addressed to the system resource from which the "read" operation is to be performed.

One known technique for reducing the idle time caused by "read" operations is through data caching. Data caching reduces idle time by reducing the number of times a "read cycle" must go all the way to a system resource to access the data. Besides reducing idle time, data caching increases system performance by providing the processor access to a high speed dedicated resource. Here, frequently accessed data, e.g. a portion of the operating software or a database, is placed in the cache. If the caches are of the write through type, then write cycles will occur more frequently then read cycles on a system resource bus. Typically, system memory on the host bus is cached using a write through type cache. If the caches are of the write back type, then the number of write cycles on the system resources bus can be potentially reduced. However, write back cache operation across bus structures are difficult to implement. It is important to note that caches are only useful for resources that provide cache operation. Such resources that do not support cache operation require the traditional write cycle operation.

Although it is clear that a FIFO structure benefits "write cycles", any reduced idle time benefit gained is offset by "read cycles". Additionally, there are certain instances where a subsequent read or write may be able to use the contents of the FIFO. It is an overall object of the present invention to provide a FIFO system between bus structures that minimizes processor idle time and that exploits the contents of a FIFO in an advantageous manner.

SUMMARY

A method and apparatus for minimizing Central Processing Unit (CPU) idle time during read and write cycles to a resource, is disclosed. The method and apparatus is used between resources (e.g. between a processor and system Random Access Memory) or bus structures that have a difference in operating speed. In the preferred embodiment, processor idle time results from the transfer of data between two bus structures. A First In First Out (FIFO) queuing scheme is used to transfer read or write requests bidirectionaly between a host bus and a system bus. Data, addresses and control information concerning a write request are posted into FIFO registers. An address block identifier corresponding to the resource being written to and descriptive information about the resource are also stored in the FIFO register. The FIFO returns an acknowledgement back to the processor that a data write request has been received. This acknowledgement enables the processor to continue processing. The FIFO further detects priority reads and writes and other conditions wherein posted write information is processed out of order. These conditions include blockwrite and selected flush. When such conditions are detected, the FIFO provides for writing all posted data items that are addressed to the same resource. The resource associated with posted write information is determined by the address that it is directed to and via an address block look up table. This capability minimizes idle time by reducing the number of posted items that need to be flushed in a READ cycle, when possible, and by making single block transfers of data to a resource.

Finally, the FIFO provides for the avoidance of going through a complete write or read cycle. In a doublewrite condition, a write command is detected to a resource supporting doublewrites and to the same address of an existing post. Rather than go through the write cycle twice for each write command, the data portion of the first posted write is overwritten with the contents of the subsequent write. Thus, eliminating one write cycle. In a writeback condition, a read command is detected to a resource supporting writebacks and to the address of an existing post. Rather than going through the entire read cycle, the posted data item is provided back to the processor.

BRIEF DESCRIPTION OF THE DRAWINGS

FIG. 3a illustrates a register layout as may be utilized by the preferred embodiment of the present invention.

FIG. 3b illustrates a flag field layout as may be utilized by the preferred embodiment of the present invention.

FIG. 3c illustrates a type field layout as may be utilized by the preferred embodiment of the present invention.

DETAILED DESCRIPTION OF THE PREFERRED EMBODIMENT

A method and apparatus that reduces the idle time of a resource, primarily a Central Processing Unit (CPU) during system resource write and read operations in computer systems with a multi-bus structure design, is disclosed. In the following description, numerous specific details are set forth such as specific resource ranges in order to provide a thorough understanding of the present invention. However, it will be obvious to one skilled in the art that the present invention may be practiced without these specific details. In other instances, well-known functions, e.g. handshaking signals, have not been described in detail in order not to unnecessarily obscure the present invention. In practice, the preferred embodiment of the present invention is utilized as an intelligent buffer between respective data, address, and control buses on a computer system. However, the use of intelligent buffers is not limited to the connection of bus structures. An intelligent buffer may also be used to provide buffering to individual components in a computer system, e.g. Random Access Memory (RAM) wherein the FIFO couples the component to a bus. Such an alternative embodiment would not depart from the spirit and scope of the present invention.

OVERVIEW OF THE COMPUTER SYSTEM OF THE PREFERRED EMBODIMENT

Figure 1A:
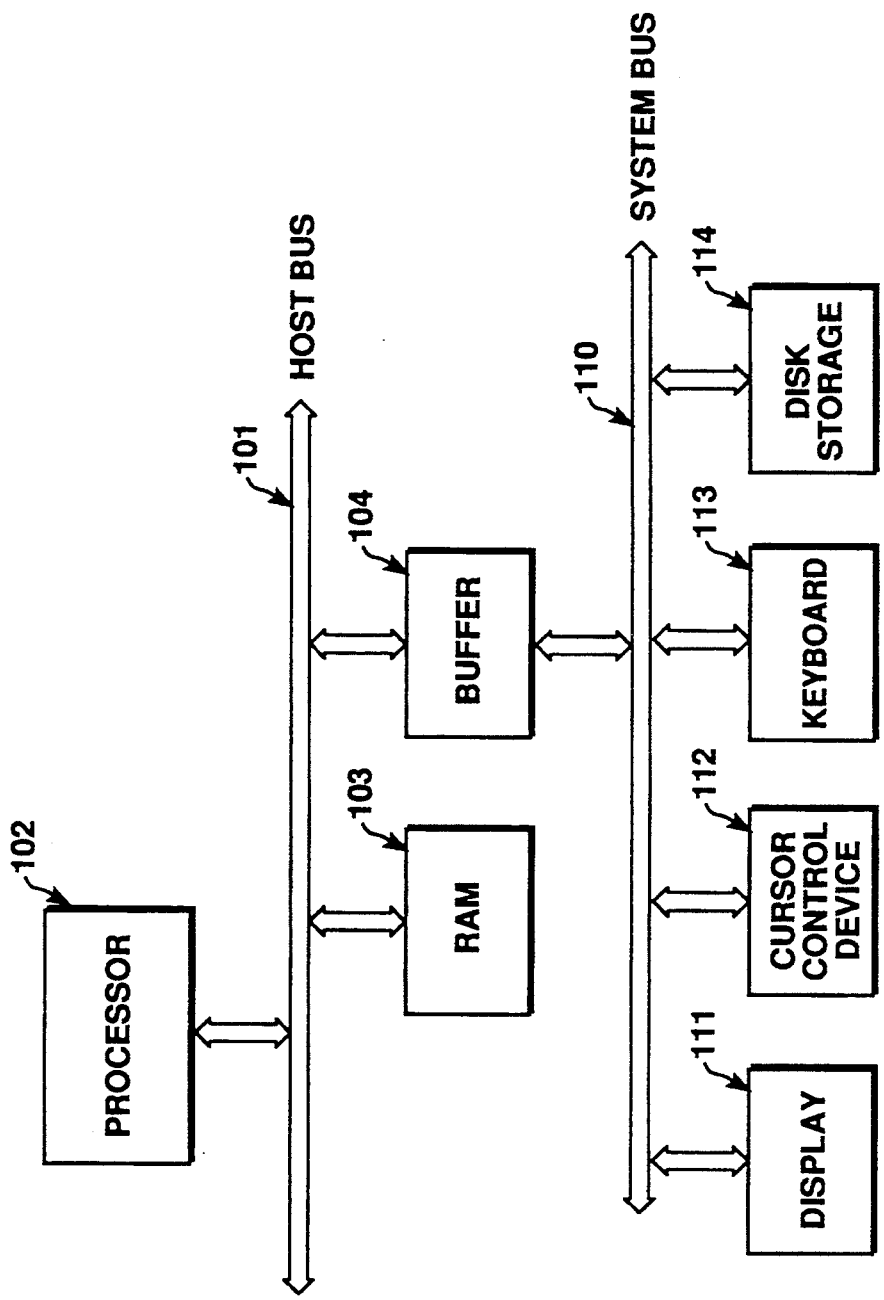
FIG. 1a illustrates a first computer system architecture as may embody the preferred embodiment of the present invention.
Figure 1B:
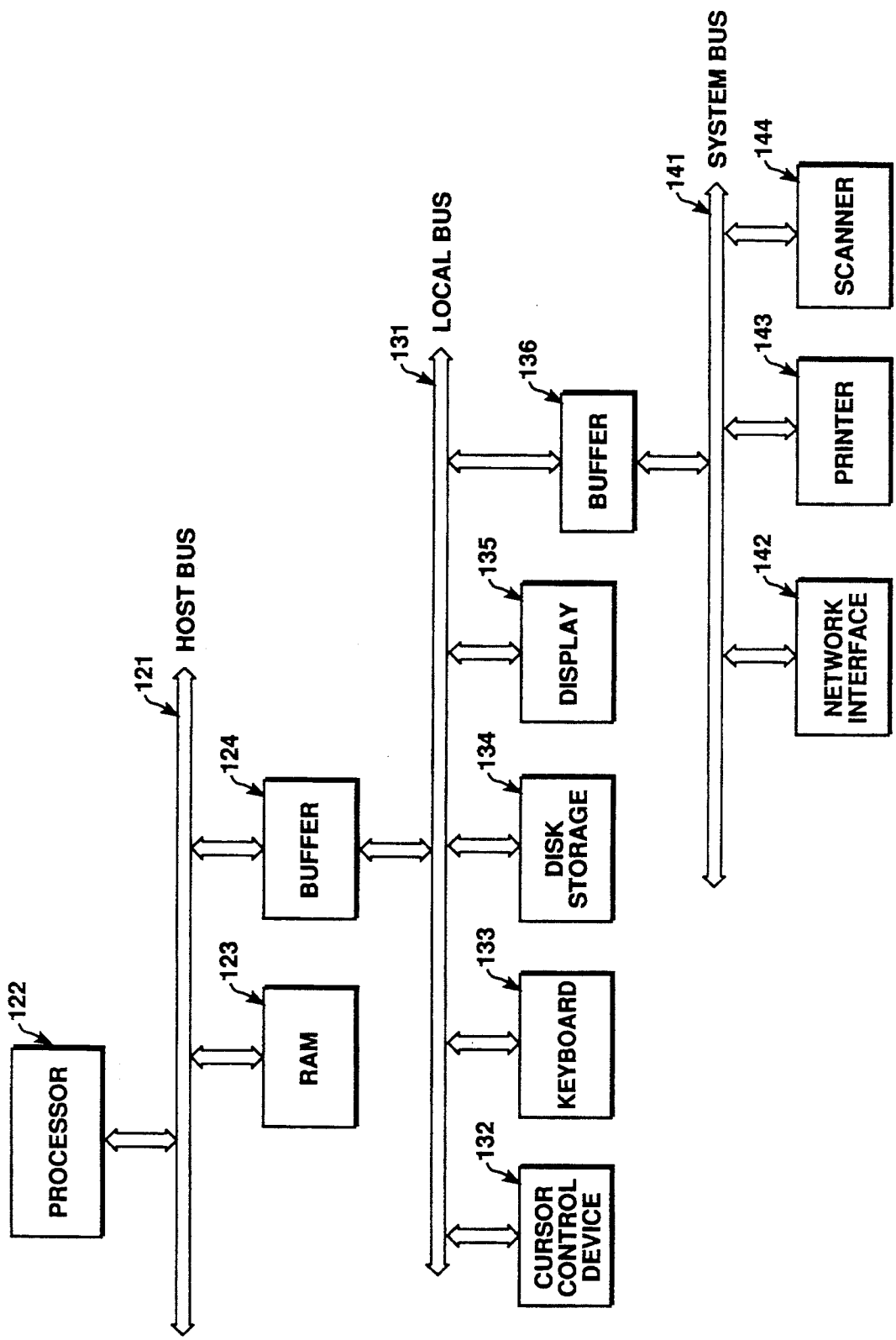
FIG. 1b illustrates a second computer system architecture as may embody the preferred embodiment of the present invention.

The preferred embodiment of the present invention is practiced on a computer system with a multi-bus design. Multi-bus design in this context, refers to designs with independent bus structures that are coupled together. Two such computer systems are illustrated in FIGS. 1a and 1b. Referring to FIG. 1a, a processor 102 and Random Access Memory (RAM) storage 103 are coupled to a host bus 101. The host bus 101 is an internal bus coupling the primary processing components for the computer system. Typically, peripherals, i.e. input/output devices, would not connect to the host bus 101. A buffer 104 is connected to host bus 101 and system bus 110. The buffer 104 provides for the flow of communication of data between the host bus 101 and the system bus 110. The system bus 110 is for connecting the input/output peripheral devices of the computer system. Such representative devices connected to the system bus 110 include a display device 111, a cursor control device 112 (such as a mouse, track-ball or cursor control keys), a keyboard 113 and disk storage 114.

Referring to FIG. 1b, a processor 122 and Random Access Memory (RAM) 123 are connected to host bus 121. A buffer 124 is coupled to the host bus 121 and local bus 131. The local bus 131 is different from the system bus 110 of FIG. 1a. Primary differences are that ports on the local bus 131 are internally designated for specific devices and operate at a higher speed. The local bus 131 provides connection for "critical" system devices such as a cursor control device 132, a keyboard 133, disk storage 134 and a display device 135. These devices are termed "critical" because without them, the computer system would be without any practical function.

Also connected to the local bus 131 is a buffer 136. The buffer 136 is further connected to a system bus 141. The system bus 141 may have the same architecture as system bus 110 of FIG. 1a. Such system bus architectures would include the Industry Standard Architecture (ISA), the Extended Industry Standard Architecture (EISA) or the Micro Channel Architecture. In any event, devices that would be connected to a system bus 141 would include a network interface 142, a printer device 143 or a scanner device 144.

Computer systems with such hierarchical bus structures are designed in order to achieve two ends; efficiently coupling devices with frequent exchange of data and maintaining compatibility with existing devices. For examples, as a processor frequently accesses system RAM and system ROM, it is desirable for them to be on the same high speed host bus. At a next level in the hierarchy are devices that also interact frequently with the processor, such as keyboards, displays, etc. This second level bus is typically the local bus. While they may be coupled to the high speed bus, it may be undesirable to do so for price/performance reasons. It is generally the case that a host bus or local bus is unique to the computer system. Finally, the last level in the hierarchy is a bus structure for an existing class of peripheral devices. For example, as many peripheral devices exist for the ISA bus structure, it is desirable to have a computer system that may use such peripheral devices.

The preferred embodiment of the present invention is practiced as an intelligent FIFO buffer between two bus structures. With reference to FIG. 1a, the present invention may replace buffer 104. With reference to FIG. 1b, the present invention may replace buffer 124 and buffer 136. This means that such an intelligent FIFO buffer is not restricted to coupling with the host bus. However, to simplify the description of the preferred embodiment invention, computer systems with a bus architecture as illustrated in FIG. 1a, are discussed. As is known to those skilled in the art, a bus structure on a computer is typically made up of three buses; a data bus, an address bus and a control line bus. The address bus provides for the transfer of addressing information while the control line bus provides handshaking and operational control information. The data bus contains commands and/or data that is written to or has been read from a resource.

As described above, there is typically a FIFO for each of the different bus structures. The process of presenting data to the respective buses is under the control of a bus arbitrator (or bus controller). Thus, each of the buses operate in an autonomous fashion. One of the FIFOs must have a degree of intelligence in order to request access to the system bus (in the case of a Write operation) or the host bus (in the case of a Read operation) from the bus controller. Conversely, intelligence must be added so that data can be used that exists in the data bus FIFO. In the preferred embodiment, the primary intelligence is incorporated into the Address Bus FIFO and the Data Bus FIFO.

OVERVIEW OF THE PREFERRED EMBODIMENT INTELLIGENT FIFO

As utilized within this description the terms intelligent buffer and FIFO are synonymous. The term posting refers to the process by which data is stored in storage means, e.g. registers embodied by the FIFO, where the data is to be written to some system resource (e.g. disk storage). An Intelligent Posting FIFO adds functional logic to the FIFO wherein conditions are detected that allow FIFO elements to be processed out of traditional FIFO order to otherwise processed in a special manner. Such processing minimizes any negative effects as a result of FIFO processing. More efficient processing by the FIFO will result in less idle time of the processor.

The intelligence in the FIFO of the preferred embodiment need only reside on one of the FIFO buffers coupling the respective data, address and control buses. Due to packaging constraints, i.e. a viable number of pins on an integrated circuit, each FIFO would typically be embodied by a separate integrated circuit. For example, if two 32-bit buses are coupled, 64 pins alone are required for the bus contents. As address information is necessary in order to identify posted elements that may be processed out of order the apparent choice to place the intelligence would be within the FIFO buffer coupling the address buses. However, in some instances the data in the data bus FIFO will be accessed. Thus, intelligence is spread across both the address bus and data bus FIFOs.

Figure 2A:
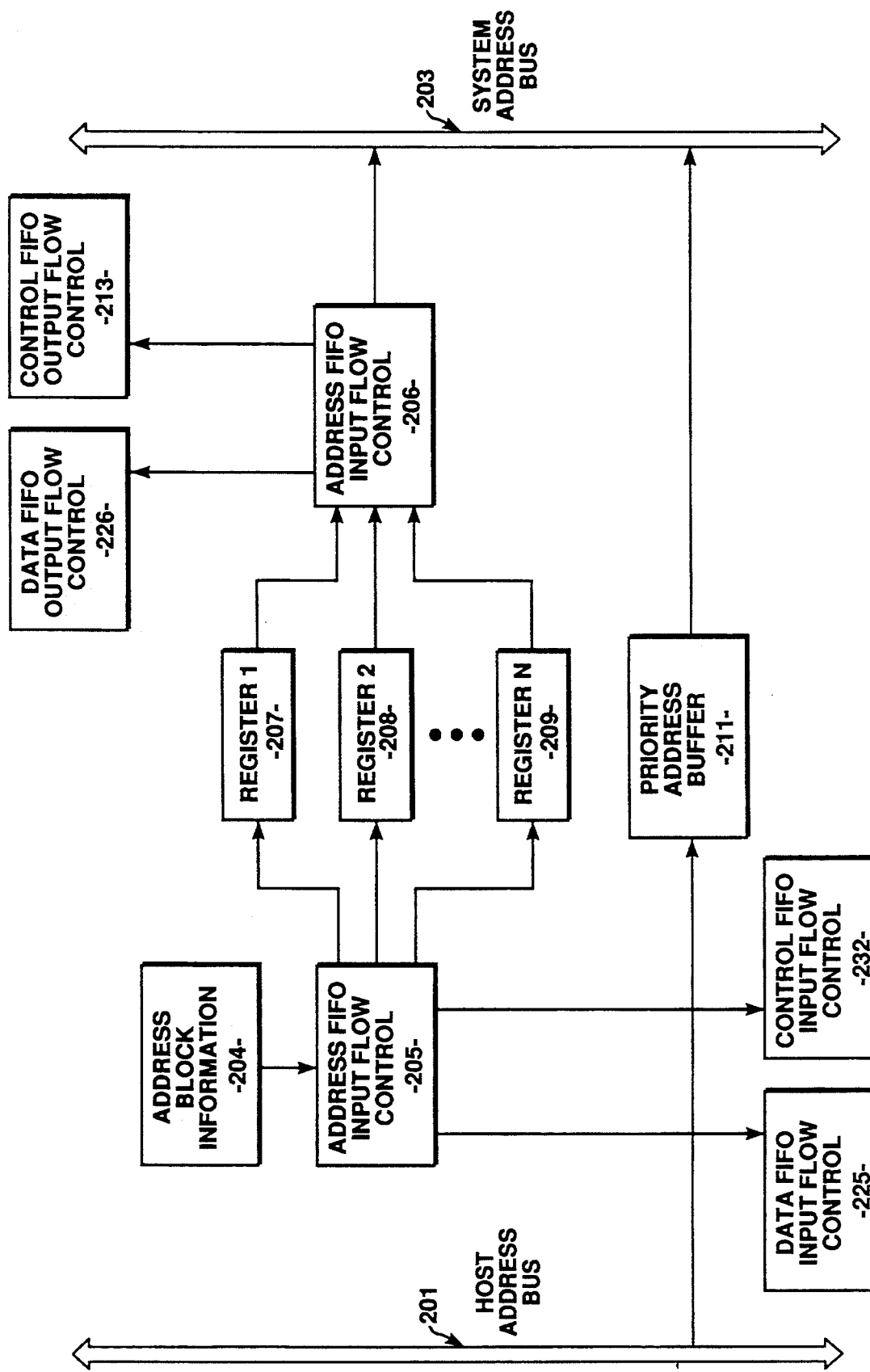
FIG. 2a is a block diagram of the component parts of an address bus intelligent FIFO as may be utilized by the preferred embodiment of the present invention.

An intelligent FIFO for the address bus is illustrated in FIG. 2a. The writing out of information in these FIFOs is performed in conjunction with information provided by the intelligent buffering mechanism and control signals from the bus controller. Illustrated in FIG. 2a are a host address bus 201 and a system address bus 203. The host address bus 201 and the system address bus 203 are used to communicate address information for corresponding read or write operations. Address FIFO Input flow control 205 is coupled to the host address bus 201. The use of address information in the preferred embodiment will become more apparent in the description of address block ranges and their relationship to particular resources. The address FIFO Input flow control 205 includes the logic which detect the conditions in which FIFO elements may be specially handled. The address FIFO input flow control logic 205 is also coupled to data FIFO input flow control 225 and control FIFO input flow control 232. This coupling provides for coordination of operation of the respective FIFOs.

Also coupled to the address FIFO input flow control 205 is address block information 204 and a plurality of registers 207–209. The address block information 204 includes a table used for identifying resources on a system or host bus and other characteristics resource information. The information contained in the address block information 204 is described in more detail below. The registers 207–209 symbolize a sequence of registers where the address if the resource to be written to, along with information concerning the resources, is stored. It should be noted that the number of registers that would be provided would be a reasonable number, dependent on a particular implementation (thus the designation Register N for register 207). In known systems, the number of registers in a bus buffer range from 5 to 10.

The layout of an address register in the preferred embodiment is illustrated in FIG. 3a. Address register 301 is comprised of a flag field 302, a type field 303, address block identifier field 304 and an address field 305. In the preferred embodiment the register 301 is 45 bits wide. The flag field 302 is 6 bits wide, the type field 303 is 3 bits wide, the address block identifier field 304 is 4 bits wide and the address field 305 is 32 bits wide.

The flag field 302 indicates the status of the register and contains information describing the types of capabilities the resource supports. These capabilities are described in more detail below. FIG. 3b illustrates a flag field in the preferred embodiment. The logical values of each of bits 310–315 indicates the status of a particular type of information. Bit 310 indicates whether the register is full or empty. Bit 311 indicates that the resource has priority read privileges. Note that for a resource that has priority read privileges, the resource has priority write privileges. Bit 312 indicates whether the resource permits writebacks. Bit 313 indicates whether the resource permits doublewrites. Bit 314 indicates whether the resource has priority write privilege. As noted above, if a resource has priority write privilege, it has priority read privilege. Further, doublewrite is disabled. Finally, bit 315 is reserved for future use.

Referring back to FIG. 3a, the type field 303 contains other resource attribute information. FIG. 3c illustrates a type field 303 as may be utilized in the preferred embodiment. A bit 320 indicates whether the resource is memory or whether it resides in I/O space (i.e. it is an I/O resource). A bit 321 indicates whether the resource resides on the system or local bus. A bit 322 is reserved for future use. The information contained in flag field 302 and type field 303 are used to determine whether certain detected conditions apply to the contents of the register.

Referring back to FIG. 3a, the address block identifier field 304 identifies an entry in an address block table that describes the resource being written to. The address block table is described in more detail below.

The address field 305 stores the write address for a specific write cycle. The 32-bit address field corresponds to the address size of currently available microprocessor devices. As microprocessor devices are developed that require a greater address field size, the address field 305 may be altered accordingly. Further, as the host bus and system bus need not be of the same width, the address field 305 must have a minimum width equal to the width of the largest address bus. It would be apparent to one skilled in the art to utilize an alternative register size with corresponding changes in the flag, data and address fields. Such alternative embodiments would not depart from the spirit and scope of the invention.

Referring back to FIG. 2a, the registers 207-209 are further coupled to address FIFO output flow control 206. The address FIFO output flow control 206 determines which of the register 207-209 address portions are to be presented to system address bus 203. The address FIFO output flow control 206 also initiates the "write cycle" onto the system bus 203. The address FIFO output flow control 206 is further coupled to data FIFO output flow control 226 and control FIFO output flow control 213. It is over these coupling that the address FIFO output flow control 206 signals to the data FIFO output flow control 226 and the control FIFO output flow control 213, the corresponding registers that will be written out onto the respective buses. In a simple scheme, the same register number would correspond to each posted write, e.g. the contents of register 1 in all the FIFOs would correspond to the same write command. In a more sophisticated scheme the relationships could differ. The priority write address buffer 211 allows addresses to immediately go from the host address bus 201 to system address bus 203 for priority operations.

As described above, the address block information 204 is used identify a resource associated with a write or read request. It is known in the art that every resource in a computer system has an address. Moreover, resources that contain memory locations have a range of addresses. Once installed within a computer system these addresses, or range of addresses, remain relatively fixed (they may change for example, if resources on a system bus are moved to different ports or "slots"). The address block information 204 includes a table of address block information. The address block information table maintains the address for the different resources in the computer system. Thus, by knowing the "write" address for posted write data or read data, the corresponding resource can be readily identified.

The address block information 204 may be programmable, non-programmable, or a combination of both. If the address block information 204 is programmable, than the resources of the computer system may be relocated and the definition of address block ranges performed dynamically. If the address block information 204 is non-programmable than the devices may not be moved once an initial definition of the address block ranges if performed. Finally, portions of the address block information 204 may be fixed, while other portions dynamic. This may be desirable since certain resources will remain relatively fixed, e.g. system DRAM, while other resources will be dynamic, e.g. a removable network interface card.

An Address Block Information Table entry as may be utilized by the preferred embodiment is illustrated in Table A.

TABLE A

| ADDRESS BLOCK INFORMATION ENTRY | | | | |
| --- | --- | --- | --- | --- |
| FLAG | TYPE | ADDRESS BLOCK IDENTIFIER | BASE ADDRESS OF RANGE | ADDRESS RANGE |

The FLAG and TYPE fields describe attributes of the resource. Such attributes were described above with respect to FIGS. 3b and 3c. The ADDRESS BLOCK IDENTIFIER identifies the ADDRESS BLOCK RANGE VALUE TABLE ENTRY for the resource (i.e. the resource itself). The BASE ADDRESS OF RANGE provides the starting address point for the resource. The ADDRESS RANGE provides the full range of address corresponding to the resource.

Figure 2B:
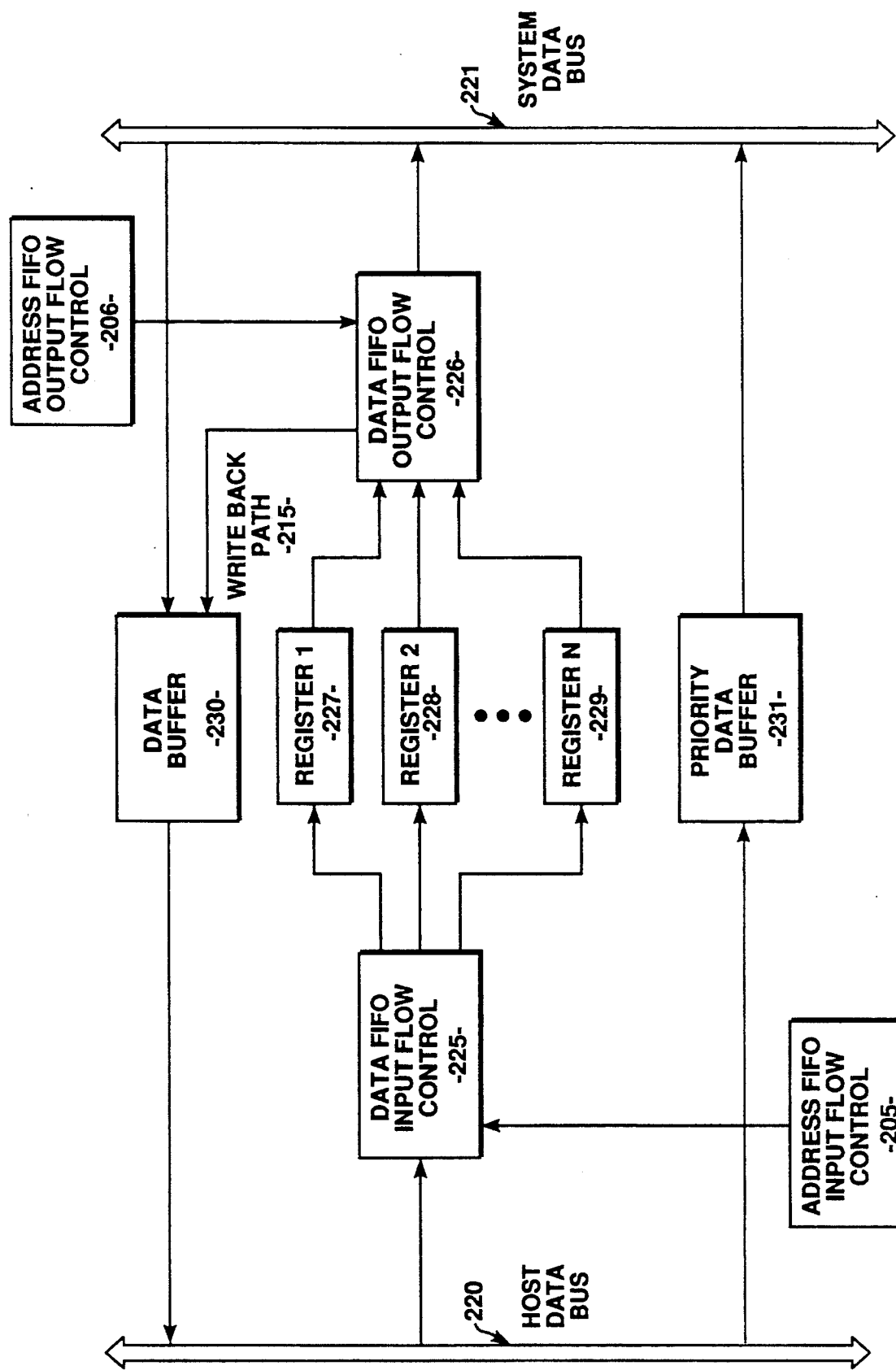
FIG. 2b is a block diagram of the component parts of a data bus intelligent FIFO as may be utilized by the preferred embodiment of the present invention.

FIG. 2b illustrates an intelligent FIFO for a data bus. The intelligent posting data FIFO in FIG. 2b is similar to the intelligent posting address FIFO in FIG. 2a. Data FIFO input flow control 225 is coupled to host data bus 220, registers 227-229 and address FIFO input flow control 205. Data FIFO output flow control 226 is coupled to address FIFO output flow control 206 and system data bus 221. The data FIFO input flow control 225 and the data FIFO output flow control 226 perform similar functions to the address FIFO input flow control 205 and address FIFO output flow control 206. The major difference between the two is the inclusion of a Data Buffer 230, the omission of Address Block Information, and the omission of logic for detecting certain conditions by address FIFO input flow control 205. The Data Buffer 230 is used for reading data from the system data bus 221 to host data bus 220 or porting writeback data from registers 227 through 229. Data from registers 227-229 is provided to data buffer 230 through data FIFO output flow control 226 via write back path 215. The Priority Write Data Buffer 231 is similar to the Priority Address Buffer 211 in FIG. 2a. Combined these buffers provide a path for data and address for priority writes from the host bus to system bus.

Another difference is the composition of Data registers 227-229. As these registers do not require certain fields, e.g. address block identifier field 304 of FIG. 3, they may be omitted.

Although not illustrated, an intelligent posting control FIFO would be similar to the data FIFO illustrated in FIG. 2b, except that data buffer 230 is not required.

As noted above, the preferred embodiment of the present invention may be implemented as an integrated circuit. For example, such a circuit may consist of programmable logic array circuitry and register storage. Such techniques for reducing the present invention to a single integrated circuit are known in the art. However, embodiments where discrete components are used, would not depart from the spirit and scope of the present invention.

OPERATION OF THE FIFO

The FIFO of the preferred embodiment is based on a cyclical First In First Out processing order. Data will be written into the registers comprising the FIFO from "top to bottom", i.e. starting with register 1. When the last (bottom) register is used, available registers will be looked for starting as the top, i.e. register 1. A FIFO pointer is provided to indicate the last register written to, i.e. the bottom of the FIFO. Processing means for managing the FIFO is found in flow control logic, i.e. input flow control 205, 225 and 232 and output flow control logic 206, 213 and 226 of FIGS. 2a and 2b respectively.

Figure 4:
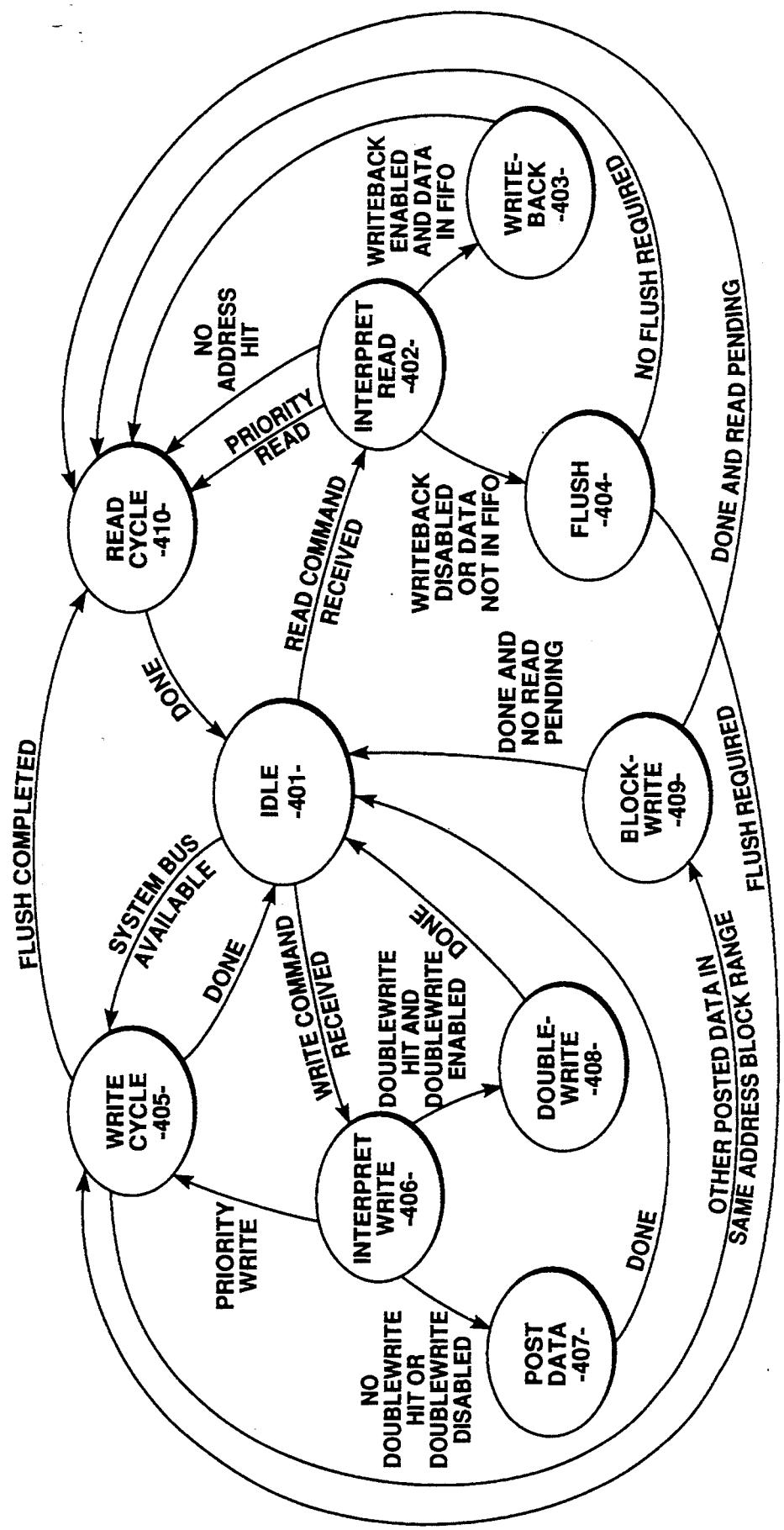
FIG. 4 is a state diagram showing the processing of the input flow control logic of FIGS. 2a and 2b as may be performed by the preferred embodiment of the present invention.

FIG. 4 is a state diagram that further describes the operation of the FIFO. In FIG. 4, an idle state 401 is the initial state for the FIFO. During this idle state, no data is being received nor are any write cycles being generated. When a read command is received, the FIFO enters an interpret read state 402. In the interpret read state 402, the FIFO will determine how the handling of the read command will be executed. First, it must be determined if the address of the read cycle is within the address base and range of the entries in the address block information table. When it does, this is termed an address hit. If an address hit did not occur, a normal read occurs by exiting to FIFO read cycle state 410, where the data is read and transferred to the requesting resource. If an address hit did occur, it must be determined if it is a priority read. This is accomplished by checking the flag field 302. An exit to FIFO read cycle state 410 will occur if the priority read is set. If the previous condition have not been met, then the FIFO continues as follows: First, it will be determined if the read command is for data that already exists in the FIFO and if writeback is permitted, i.e. there is existing posted data at the requested read address. If such a post exists and writeback is permitted, then write back state 403 is entered. In write back state 403, the posted data will be provided to the requesting resource. Once this is accomplished, the write-back state 403 will enter FIFO ready cycle state 410. If the data is not in the FIFO or a writeback is not permitted, then a selected flush state 404 is entered. As described above, all existing posted data that is within the address block of the date to be read must be written. If no posted data for the resource to be read from exists, then the flush state 404 enters FIFO read cycle state 410. If such posted items do exist, then the system resource address is provided to a FIFO write cycle state 405 and potentially to blockwrite state 409 wherein the effected posted data or block of data will be written. Once the effected posted items are written, the FIFO read cycle state 410 is entered.

Referring back to idle state 401, if the system bus becomes available, then FIFO write cycle state 405 is entered and a write cycle is performed. When the write cycle is completed the idle state 401 is again entered. During a FIFO write cycle 405, if it is detected that other posted data to the same resource exists, then blockwrite state 409 is entered. In blockwrite state 409, all posted data items to the same resource are written during the same access to the system bus. Once this write cycle is completed, the idle state 401 is again entered.

Referring back to the idle state 401, if a write command is received then the interpret write state 406 is entered. If the write is interpreted as a priority write, then the FIFO write cycle 405 is immediately entered through the priority write buffer described above, and the posting process is avoided. If it is not a priority write then it must be determined whether or not an existing post is outstanding to the same write address. If such a post does exist and the doublewrite is enabled, then a doublewrite state 408 is entered. Doublewriting being enabled is checked by examining the doublewrite bit in the flag field of the register of the existing post. In the doublewrite state 408 the posted data at the same address is identified, and the data portion of that posted data item is rewritten with the new data of the current write command. Once the doublewrite is completed, the idle state 401 is again entered. If there is no existing post or the doublewrite flag bit is disabled to the same write address, then posting data state 407 is entered and the data is posted in the FIFO. Once the posting is completed, the idle state 401 is again entered.

The specific functions of the intelligent FIFO are now described in more detail.

FIFO WRITE CYCLES

Figure 5:
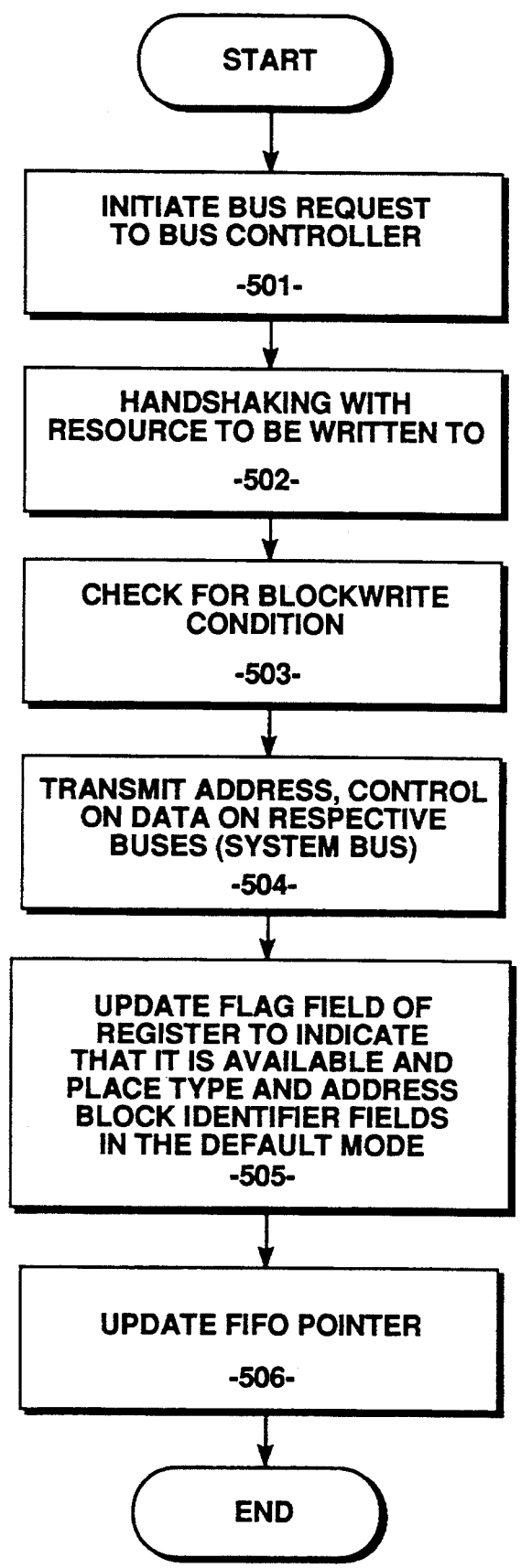
FIG. 5 is a flowchart illustrating the steps taken by the intelligent FIFO in processing a write cycle as may be performed by the preferred embodiment of the present invention.

When data has been posted to the FIFO or the priority write buffer a FIFO write cycle is invoked by the address FIFO output flow control in order to place the data on the system bus for transfer to the resource. FIG. 5 is a flowchart illustrating a FIFO write cycle as may be performed by the address FIFO output flow control of the preferred embodiment. First, a bus request is made to a bus controller in order to gain access the system bus, step 501. This bus request is made by the address FIFO output flow control to the system bus controller. After the system bus has been provided to the FIFO, handshaking signals are exchanged with the resource to be written to, step 502. A blockwrite condition is then checked for, step 503. The blockwrite is described in more detail below with reference to FIG. 7. The data is then transmitted to the resource on the respective address, control and data buses, step 504. The flag field of the the corresponding registers in the FIFOs is then updated to indicate that the register written from is now available, and the type field and address block identifier field are placed in the default mode, step 505. Finally, the address FIFO input flow control pointer is updated to reflect the new "top" of the FIFO, step 506.

RESOURCE WRITE REQUESTS

When a write command is received, the information will either be posted or specially processed because a priority write or doublewrite condition is detected. Posting refers to the placing of address, data and control information into the FIFO registers. Posting also includes the generation of the proper values for the respective fields described in FIG. 3.

A priority write condition is one where the FIFO process is overridden so that the data to be written is immediately provided to the system bus. Such an instance may occur for example, in the handling of an interrupt wherein system operation would halt unless the interrupt is serviced.

For doublewriting, a write command is issued to a specific address for which data is already posted. In this situation, the preferred embodiment recognizes that the address is posted in the FIFO and merely overwrites the existing data FIFO data element. The benefit of doublewriting is that the most current data is contained in the resource without writing to the same address in the resource twice.

Figure 6:
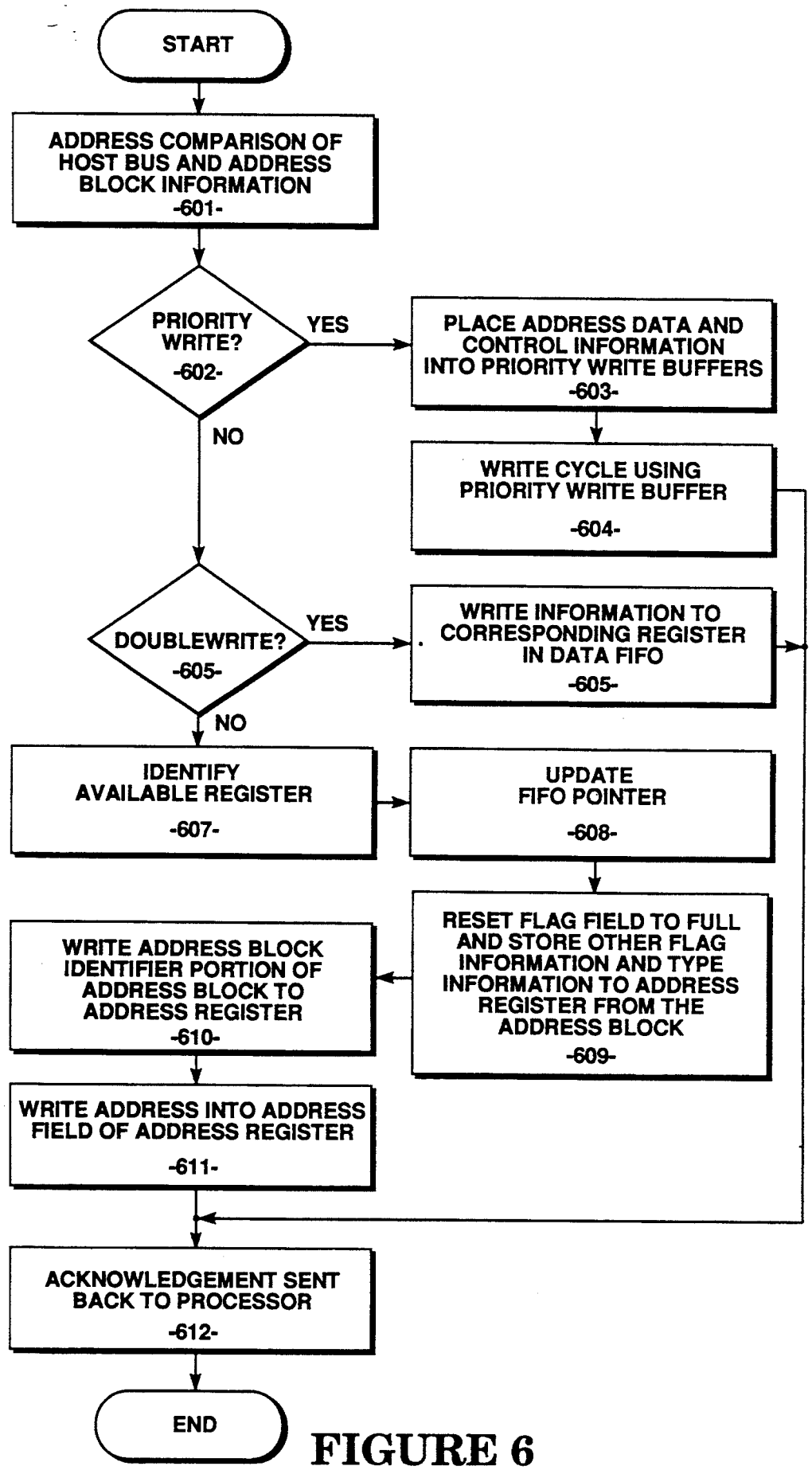
FIG. 6 is a flowchart illustrating the steps taken by the intelligent FIFO in processing a write request as may be performed by the preferred embodiment of the present invention.

FIG. 6 is a flowchart illustrating the steps taken by the FIFO when a write command is received. First, the address FIFO input flow control compares the address of the incoming write command with the contents of the address block information table in the address block information, step 601. A check for a priority write condition is then made, step 602. A priority write condition is present if the address being written to is a priority address block, e.g. the address block for an interrupt handler. If such a priority write condition is present, then the address FIFO input flow control causes address, data and control information to be written to corresponding priority write buffers in the respective FIFOs. A FIFO write cycle for the contents of the priority write buffers is initiated by the address FIFO output flow control, step 604. An acknowledgement is then sent back to the originating resource, i.e. the processor, step 612, to allow processing to continue.

If a priority write condition is not present, the address FIFO input flow control then checks for a doublewrite condition, step 605. A doublewrite condition exists if the address being written to has an existing posted write command and the resource being written to supports doublewrites. Resource types include DRAMs. The resource types are readily determined by examining the doublewrite bit in the flag field in the address register. If a doublewrite condition exists, the respective address, data and control information is written into the identified register of the respective FIFOs, step 606. Once this is completed an acknowledgement is sent back to the processor, step 612.

If the doublewrite condition does not exist, the data, address and control information is to be posted. A first step in posting is to identify an available register, step 607. An available register is determined by examining the flag field of the registers, starting at the point indicated by the FIFO pointer. Once an available register is identified, the FIFO pointer is updated, step 608. Information from the corresponding address block information table entry is stored in the flag and type fields of the selected register and the full/empty bit in the flag field is reset to indicate that the register is full, step 609. An identifier that indicates the address block entry which corresponds to the posted address is inserted into the address register, step 610. The address is then placed into the address field of the address register, step 611. As the final step in the posting process, an acknowledgement is sent back to the processor so that it may resume processing, step 612.

BLOCKWRITES

Blockwriting causes FIFO elements to be "written" out of the first in first out order. Blockwriting and selected flushing (described below) cause the writing of all posted data in the FIFO for a particular resource. Blockwriting occurs when a resource is to be written to, "in turn". All posted data for the resource "in turn" will all be written. The benefits of blockwriting are that arbitration for the system bus need only be performed once and space on the FIFO is freed. Further, subsequent reads may have less posted data that would require flushing.

Figure 7:
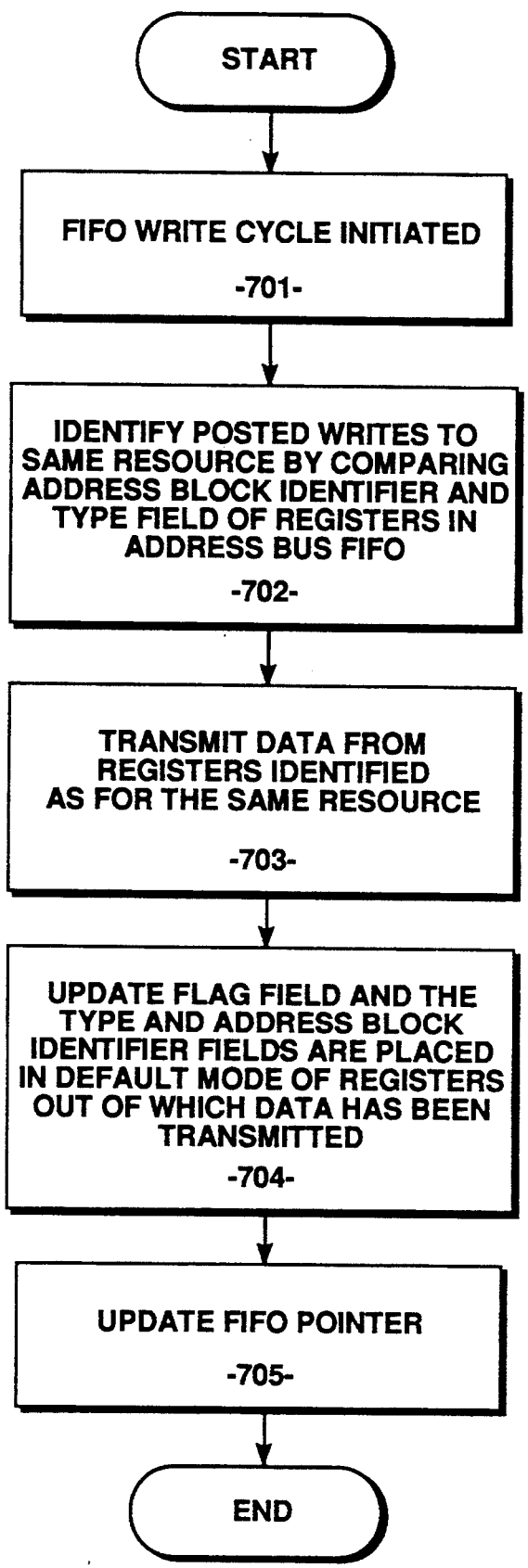
FIG. 7 is a flowchart illustrating the steps of a block-write operation as may be performed by the preferred embodiment of the present invention.

FIG. 7 illustrates the steps taken for a blockwrite. A blockwrite condition is checked for whenever a write cycle is initiated. So as a first step, a write cycle must be initiated, step 701. This will initiate a check of the address block identifier and type fields of all the registers containing posted information to determine if they are posted for the same resource, step 702. Data is then transmitted from the registers in the respective address, control and data FIFOs, that were identified as to be written to the same resource, step 703. The flag field of the registers from which data has been transmitted is updated to reflect that the registers are now available as well as placing the type and address block identifier fields into the default mode, step 704. Finally, the FIFO pointer is updated to reflect the new top of the FIFO, step 705.

RESOURCE READ REQUESTS

When a read request is detected, the input flow control of the FIFO may recognize the request as a priority read, determine that a writeback condition exists or invoke a selected flush. A priority read is similar to a priority write in that the normal First In First Out queuing is overridden and the request is immediately processed.

A writeback condition occurs when a read request is received for data at an address for which data is already posted. In such instances, the FIFO will provide the information to the processor. The benefit derived is that a complete read cycle is avoided.

A selected flush operates in the same manner as a blockwrite. A selected flush causes all posted information for a resource to be written prior to a read cycle being performed. To appreciate the benefits of a selected flush, it must be understood that for some resource types, prior to a read operation to a resource, all posted "write" data for the resource must be written to the resource. This ensures the integrity of the data to be read from the resource. Prior techniques caused all posted data to be written. By using the Address Block Range as discussed above, the posted write data for the resource may be identified and written to the resource. As not all the data in the FIFO must be flushed, i.e. written to the corresponding resource, the idle time experienced by the processor waiting for the data to be provided, is minimized.

Figure 8A:
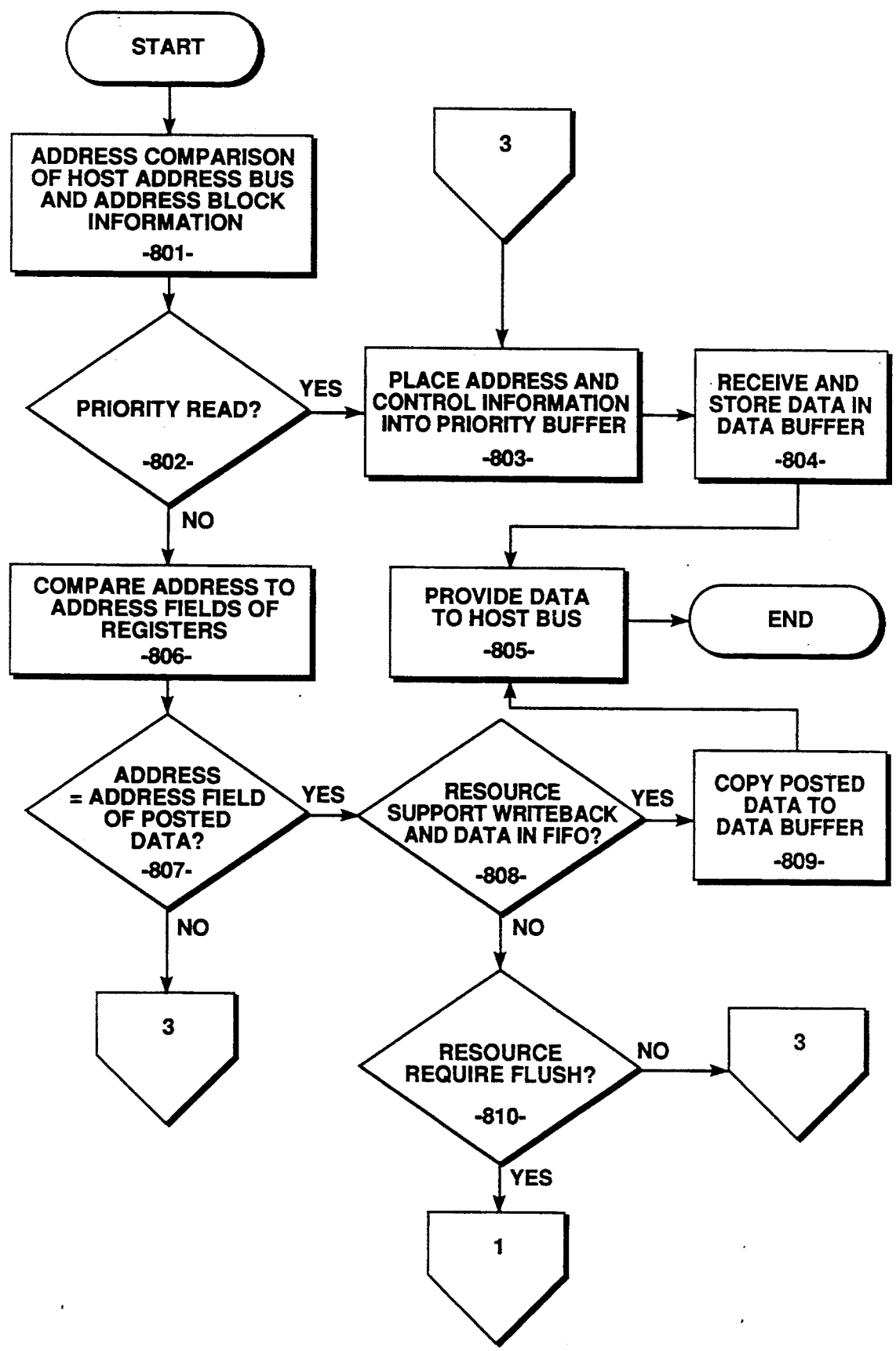
FIGS. 8a and 8b are flowcharts illustrating the steps taken by the intelligent FIFO in processing a read request as may be performed by the preferred embodiment of the present invention.
Figure 8B:
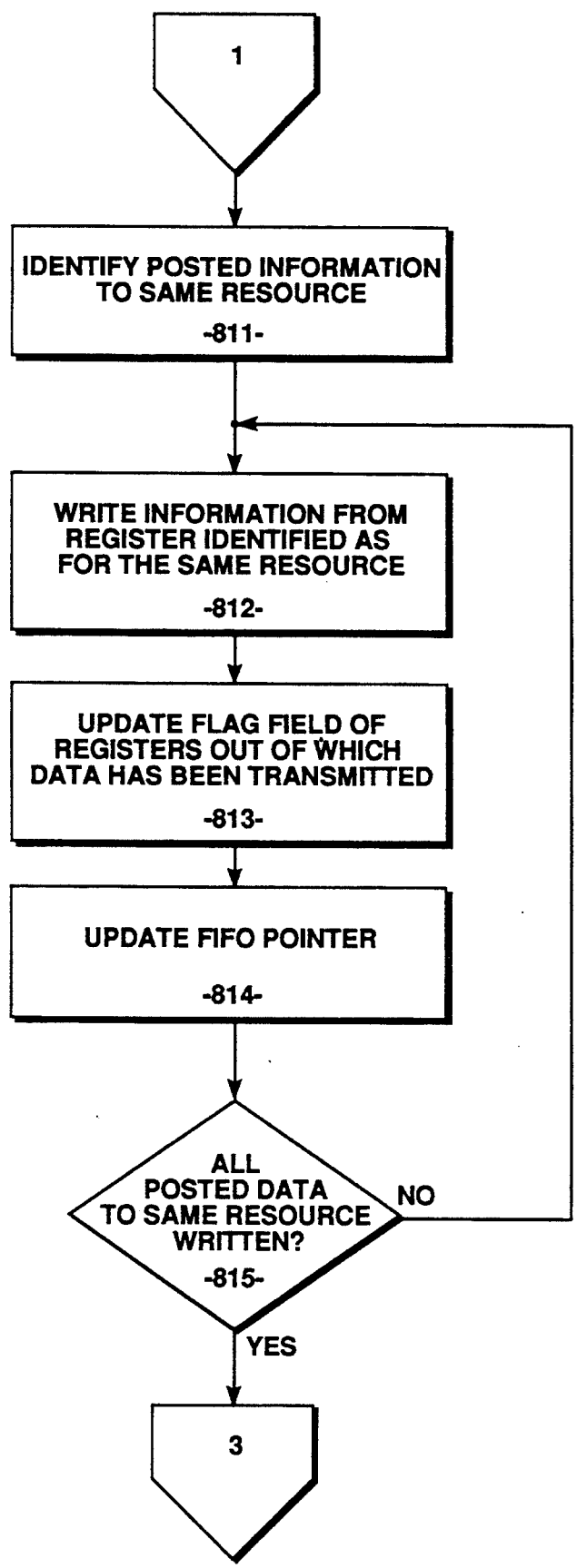

FIGS. 8a and 8b illustrates the processing when a read request is received and an address hit occurs. Referring to FIG. 8a, the address input flow control compares the address on the host address bus to the contents of the address block information to determine if certain read conditions exist, step 801. A priority read is checked for, step 802. A priority read will be detected if the destination resource is a priority address block. If a priority read is detected, the input flow control will cause the address and control information to be put into the respective priority buffers of the FIFOs, step 803. When the data is received back, it is placed into the data buffer, step 804, and provided as data to the host bus, step 805. At this point the priority read is completed.

If a priority read condition is not detected, the input flow control compares the address on the host bus with address field of the different registers, step 806. First, it is determined if the address on the host bus is the same as any of the address fields of posted data, step 807. If no post exists, the read is completed by exiting to step 803. If such a post exists, it is determined if the destination resource supports a writeback, step 808. Such resources that support a writeback include single ported memory. If a writeback is supported by the resource, the posted information is then copied to the data buffer, step 809, and data is provided to the host bus per step 805. At this point the writeback is completed.

If writeback is not supported or data is not in the FIFO, then a selected flush conditions is then checked for, step 810. This is determined by examining information from the flag field of the address block entry corresponding to the resource being read from. If the resource does not require all posted data to be written, the address and control information is read into priority buffers of the respective FIFOs per step 803. The steps 804 and 805 are then executed as described above.

Referring to FIG. 8b, if all posted data to the resource must be written, a check of the address block identifier and type fields of registers with posted data is made to determine if any are writing to the same resource, step 811. Data is then transmitted from the registers in the respective address, control and data FIFOs, that were identified as to be written to the same resource and had to be flushed prior to reads, step 812. The flag field of the registers from which data has been transmitted is updated to reflect the status that the registers are now available, as well as default values placed into the address block identifier and type fields, step 813. The FIFO pointer is then updated to reflect the new top of the FIFO i.e. the next data to be written out, step 814.

A check is made to see if all posted data to the same resource has been written, step 815. If all data has not been written, the data for from the register pointed to by the FIFO pointer is written out per step 812. If all posted data is written, a read is initiated per step 803.

The interpretation of the action taken given the address block information described above is but one representative protocol. Alternative protocols utilizing the address block information are possible. Utilization of such alternative protocols would not depart from the spirit and scope of the present invention.

Thus, a method and apparatus that reduces the idle time of a system resource, primarily a processor, is disclosed.

I claim:

1. A method of controlling access to a resource in a computer system, comprising the steps of:
   receiving a write command followed by a first command, wherein said write command and said first command are directed to said resource;
   storing a priority information corresponding to said commands in a memory means;
   determining whether said first command is a priority command based on said priority information; and
   dispatching said first command before dispatching said write command to said resource if said first command is a priority command, such that said resource receives said first command before said write command.

2. The method of claim 1 wherein said step of receiving receives said write command and said first command from a processor.

3. The method of claim 2, wherein said first command is a read command comprising a first address in said resource, said read command specifying a read operation in said resource.

4. The method of claim 3 wherein said read operation comprises the steps of:
   determining a third write command in said buffer means wherein said address of said third write command is equal to said first address;
   retrieving said data element corresponding to said third write command from said buffer means; and
   sending said data element corresponding to said third write command to said processor in response to said read command.

5. The method of claim 1, wherein said first command is a second write command comprising a second data element and a second address in said resource.

6. The method of claim 5 further comprising the step of sending an acknowledgement signal corresponding to said second write command to said processor after said step of dispatching said first command.

7. The method of claim 6 further comprising the step of storing said second write command in a buffer means if said first command is determined not to be a priority command.

8. The method of claim 7 further comprising the steps of:
   determining whether a system bus coupled to said buffer means and said resource is idle; and
   dispatching said second write command to said resource over said system bus if said system bus is idle.

9. A method of accessing a resource in a computer system, said resource including at least one addressable memory location, said method comprising the steps of:
   receiving a first write command followed by a second write command, each of said write commands comprising a data element and an address in said resource;
   storing said first write command in a buffer means;
   determining whether said address of said first write command is equal to said address of said second write command; and
   overwriting said first write command in said buffer means with said second write command if said address of said first write command is equal to said address of said second write command.

10. The method of claim 9 further comprising the step of storing said second write command in said buffer means if said address of said first write command is not equal to said address of said second write command.

11. The method of claim 10 further comprising the steps of:
    determining whether a system bus coupled to said buffer means and said resource is idle; and
    transferring said second write command to said resource if said system bus is idle.

12. The method of claim 11 wherein said step of receiving receives said write command and said first command from a processor.

13. The method of claim 12 further comprising the step of sending a first acknowledgment signal corresponding to said first write command to said processor.

14. The method of claim 13 further comprising the step of sending a second acknowledgment signal corresponding to said second write command to said processor.

15. A circuit for controlling access to a resource in a computer system, comprising:
    input flow control means for receiving a write command followed by a first command, wherein said write command and said first command are directed to said resource, said input flow control means transferring said write command over a first bus and said first command over a second bus;

first buffer means for receiving said write command over said first bus, said first buffer means storing said write command;

second buffer means for receiving said first command over said second bus, said second buffer means storing said first command; and output flow control means for controlling dispatch of said write command in said first buffer means to said resource, said output flow control means controlling dispatch of said first command in said second buffer means to said resource, said output flow control means causing said first command to be dispatched prior to causing said write command to be dispatched to said resource such that said resource receives said first command before said write command.

16. The circuit of claim 15 further comprising a processor for sending said write command and said first command over a host bus, said input flow control means receiving said first command and said command over said host bus.

17. The circuit of claim 15 further comprising a memory means for storing a priority information corresponding to said write commands, said input flow control means retrieving said priority information from said memory means.

18. The circuit of claim 17 wherein said input flow control means determines that said first command is a priority command based on said priority information prior to dispatching to said second buffer means.

19. The circuit of claim 18, wherein said first command is a read command comprising a first address in said resource from which a first data element is to be read.

20. The circuit of claim 18, wherein said first command is a second write command comprising a second data element and a second address in said resource into which said second data element is to be written.

21. The circuit of claim 20 wherein said input flow control means sends an acknowledgment signal corresponding to said second write command to said processor after receiving said second write command.

22. The circuit of claim 18 wherein said input flow control means receives a third write command, determines that said third write command is not a priority command based on said priority information and stores said third write command in said first buffer means.

23. The circuit of claim 22 wherein said output flow control means dispatches said third write command to said resource when said system bus is idle.

24. A circuit for processing a plurality of write commands to a resource in a computer system, said resource including at least one addressable memory location, each of said write commands comprising a data element and an address in said resource, said circuit comprising:

input flow control means for receiving said write commands including a first write command followed by a second write command; and storing means for storing said first write command in a buffer means under control of said input flow control means, said storing means overwriting said first write command with said second write command if said address of said first write command is equal to said address of said second write command.

25. The circuit of claim 24 further comprising a processor, said processor sending said first write command and said second write command over a host bus, said input flow control means receiving said first write command and said second write command over said host bus.

26. The circuit of claim 25 wherein said input flow control means sends an acknowledgment signal corresponding to said second write command to said processor.

27. The circuit of claim 24 wherein said input flow control means receives a third write command, said input flow control means causing said third write command to be stored in a second entry in said buffer means on determining that the address of said third write command is not equal to said address of said first write command.

28. The circuit of claim 27 wherein said input flow control means sends an acknowledgment signal corresponding to said third write command to said processor.

* * * * *